(12) United States Patent
Rodgers et al.

(10) Patent No.: US 12,189,829 B2
(45) Date of Patent: Jan. 7, 2025

(54) MANAGEMENT OF ROOT KEY FOR SEMICONDUCTOR PRODUCT

(71) Applicant: AVAGO TECHNOLOGIES INTERNATIONAL SALES PTE. LIMITED, Singapore (SG)

(72) Inventors: Steve Rodgers, San Diego, CA (US); Rui Pedro de Moura Alves Pimenta, Bristol (GB)

(73) Assignee: Avago Technologies International Sales Pte. Limited, Singapore (SG)

( * ) Notice: Subject to any disclaimer, the term of this patent is extended or adjusted under 35 U.S.C. 154(b) by 128 days.

(21) Appl. No.: 17/746,345

(22) Filed: May 17, 2022

(65) Prior Publication Data
US 2023/0409758 A1 Dec. 21, 2023

(51) Int. Cl.
*G06F 21/73* (2013.01)
*G06F 21/57* (2013.01)
*G06F 21/62* (2013.01)

(52) U.S. Cl.
CPC ............ *G06F 21/73* (2013.01); *G06F 21/575* (2013.01); *G06F 21/62* (2013.01)

(58) Field of Classification Search
CPC ........ G06F 21/73; G06F 21/575; G06F 21/62; H04L 9/0819
See application file for complete search history.

(56) References Cited

U.S. PATENT DOCUMENTS

| | | | | |
|---|---|---|---|---|
| 10,110,380 | B2 * | 10/2018 | van den Berg | G06F 21/572 |
| 10,521,618 | B1 * | 12/2019 | Zhang | H04L 9/0643 |
| 10,735,190 | B1 * | 8/2020 | Khare | H04L 9/0877 |
| 11,550,877 | B2 * | 1/2023 | Volkening | H04L 63/06 |
| 2009/0238367 | A1 | 9/2009 | Pinder | |
| 2012/0079287 | A1 * | 3/2012 | Leclercq | G06F 21/575 713/192 |
| 2013/0019105 | A1 * | 1/2013 | Hussain | G06F 21/31 713/189 |
| 2015/0113278 | A1 * | 4/2015 | Cocchi | H04L 63/0853 713/171 |
| 2019/0097999 | A1 * | 3/2019 | Kocher | H04L 63/061 |
| 2021/0091952 | A1 * | 3/2021 | Wentz | H04L 9/3278 |
| 2022/0108018 | A1 * | 4/2022 | Osorio Lozano | G06F 9/4403 |

FOREIGN PATENT DOCUMENTS

CN 107276756 10/2017

OTHER PUBLICATIONS

Franz-Josef Streit et al., Secure Boot from Non-volatile Memory for Programmable SoC Architectures. IEEE (Year: 2020).*
Extended European Search Report EP Application No. 23171656.4 dated Oct. 9, 2023.

* cited by examiner

*Primary Examiner* — Shanto Abedin
(74) *Attorney, Agent, or Firm* — Foley & Lardner LLP

(57) ABSTRACT

A method which comprises storing a readable identifier, which identifies a semiconductor product, and a unique key, being unique for said semiconductor product or for a group of semiconductor products, in a memory of said semiconductor product, generating an initial security data structure, said initial security data structure depending on a root key and on said unique key, wherein both said root key and said unique key are assigned to said semiconductor product, and wherein said initial security data structure is assigned to said readable identifier, and supplying said initial security data structure to said semiconductor product for further processing.

18 Claims, 4 Drawing Sheets

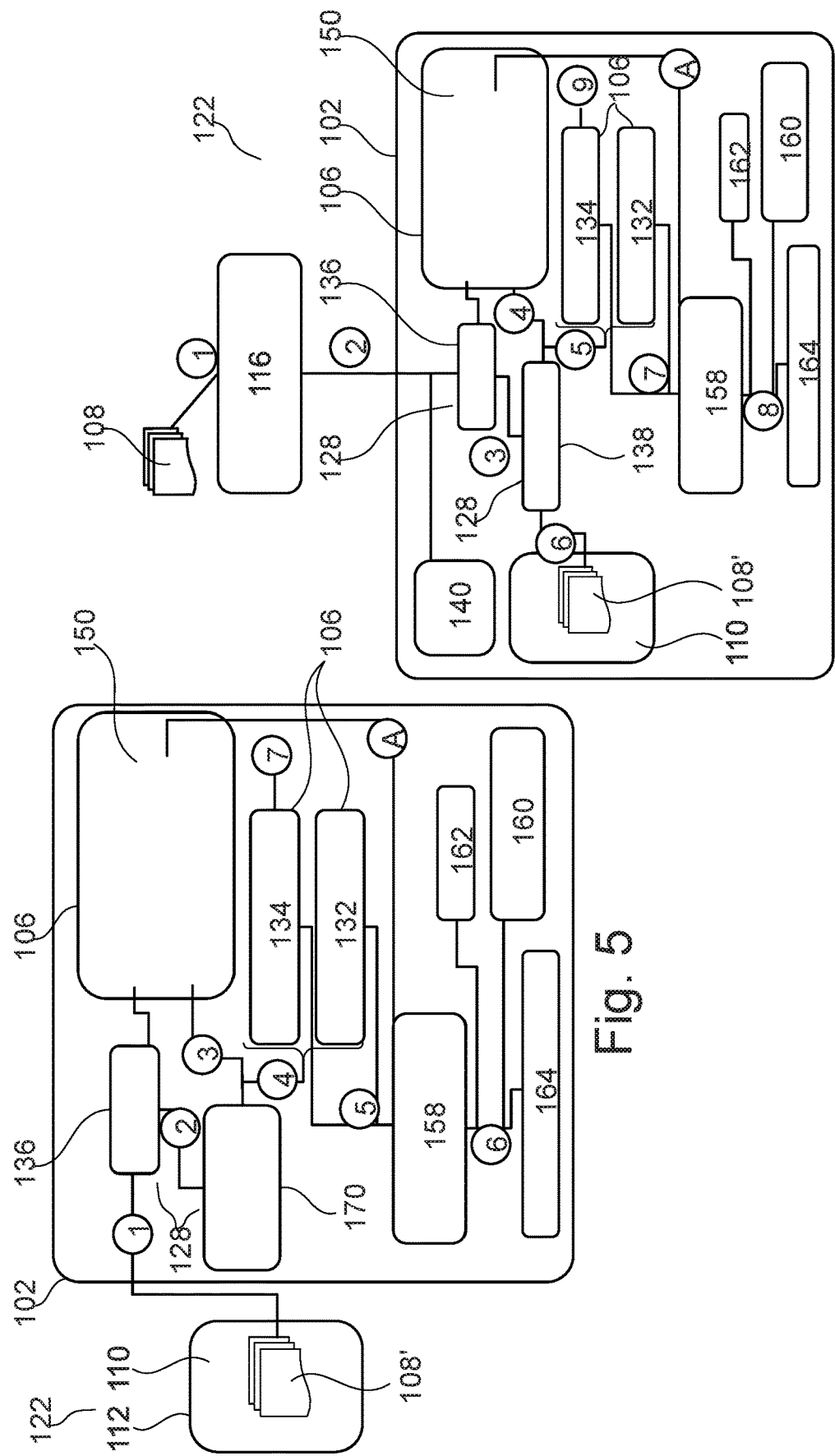

MANAGEMENT OF ROOT KEY FOR SEMICONDUCTOR PRODUCT

FIELD OF THE DISCLOSURE

This disclosure generally relates to a method, a system, and a semiconductor product.

BACKGROUND OF THE DISCLOSURE

Traditionally, security-sensitive semiconductor products are delivered with a root key stored therein during manufacture or provisioning, i.e. when a semiconductor product leaves a manufacturer or vendor. However, this may lead to complex logistics and a high amount of semiconductor area in the semiconductor product used for root key storage.

BRIEF DESCRIPTION OF THE DRAWINGS

Various objects, aspects, features, and advantages of the disclosure will become more apparent and better understood by referring to the detailed description taken in conjunction with the accompanying drawings. In the drawings, like reference numbers generally indicate identical, functionally similar, and/or structurally similar elements.

FIG. 5 illustrates a semiconductor product according to an exemplary embodiment;

FIG. 6 illustrates a semiconductor product at a product recipient entity according to another exemplary embodiment;

Figure 1:
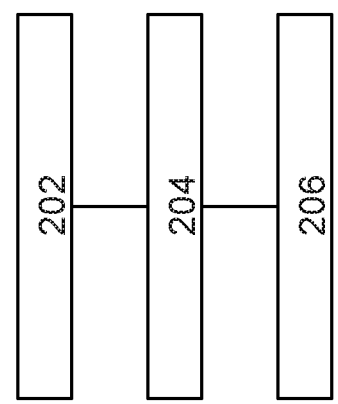
FIG. 1 illustrates a flowchart of a method according to an exemplary embodiment.

The details of various embodiments of the method, system and semiconductor product are set forth in the accompanying drawings and the description below.

DETAILED DESCRIPTION

Below are detailed descriptions of various concepts related to, and embodiments of, techniques, approaches, methods, apparatuses, and systems for managing a root key of a semiconductor product. The various concepts introduced above and discussed in detail below can be implemented in any of numerous ways, as the described concepts are not limited to any particular manner of implementation. Examples of specific embodiments and applications are provided primarily for illustrative purposes.

In an embodiment, a method is provided which comprises storing a readable identifier, which identifies a semiconductor product, and a unique key, being unique for said semiconductor product or for a group of semiconductor products, in a memory of said semiconductor product. The method may further comprise generating an initial security data structure, said initial security data structure depending on a root key (in particular a plurality of root keys) and on said unique key. Both said root key and said unique key may be assigned to said semiconductor product. Said initial security data structure may be optionally assigned to said readable identifier. Furthermore, the method may comprise supplying said initial security data structure to said semiconductor product for further processing.

In another embodiment, a semiconductor product is provided which comprises a memory in which a readable identifier, identifying said semiconductor product, and a unique key, being unique for said semiconductor product or for a group of semiconductor products, are stored. Said readable identifier and said unique key may be assigned to an initial security data structure and to a boot security data structure which both depend on a root key being assigned to said semiconductor product and which both depend on said unique key. Furthermore, the semiconductor product may comprise a further processing logic configured for further processing, using said unique key, said initial security data structure upon receipt of said initial security data structure for generating said boot security data structure for use by said semiconductor product for booting.

In still another embodiment, a system is provided which comprises a semiconductor product comprising a memory in which a readable identifier, identifying said semiconductor product, and a unique key, being unique for said semiconductor product or for a group of semiconductor products, are stored. The system may comprise a storage unit storing a boot security data structure which depends on a root key and on said unique key. Both said root key and said unique key may be assigned to said semiconductor product. Said boot security data structure may be optionally assigned to said readable identifier and may be used by said semiconductor product for booting.

In the context of the present application, a "semiconductor product" may, for example, comprise a physical body, component or member, or even a device made of two or more different elements, being manufactured partially or entirely in semiconductor technology. For instance, the semiconductor product may comprise one or more semiconductor chips, in particular a naked or molded die. Also systems on a chip (SoC), modules, chipsets, chiplets or other electronic devices comprising one or a plurality of semiconductor chips may be denoted as semiconductor product. Semiconductor products may be manufactured for example in group IV semiconductor technology (for instance in silicon technology) or in group III-V semiconductor technology (for example in gallium arsenide technology). In particular, a semiconductor product may mean an individual physical chip.

In the context of the present application, a "readable identifier" may, for example, be a data element which can be freely read out without cryptographic keys or other secret information for accessing the readable identifier. The readable identifier may also be a public identifier and may be non-encrypted. The readable identifier may be stored in a memory of the semiconductor product and may include information for identifying this semiconductor product and for distinguishing this semiconductor product from other semiconductor products.

In the context of the present application, a "unique key" may, for example, be a cryptographic key assigned to only one specific and assigned semiconductor product or a group of products. Thus, the unique key may be uniquely assigned to said semiconductor product or product group only, and not to other semiconductor products. Such a unique key may be a piece of information (for example a string of numbers and/or letters) which, when processed through a cryptographic algorithm, can encode and/or decode cryptographic data relating to a specific semiconductor product. For instance, a unique key may be provided per unit even if the semiconductor product type is the same. For example, a certain semiconductor product type may have millions of parts and each part may have a unique identifier and secret key. Thus, a unique key may be stored per physical device.

In the context of the present application, a "security data structure" may, for example, be a data set which can include and/or can depend on a unique key and a root key. In particular, the security data structure may include information about a root key and may be encrypted by a unique key. Since a data structure created in this way may relate to a data security function, it can be denoted as security data structure.

In the context of the present application, an "initial security data structure" may, for example, denote a security data structure created initially during or in conjunction with a process of manufacturing an assigned semiconductor product. More specifically, an initial security data structure may be created separately from a semiconductor product at a product supplier entity manufacturing and supplying said semiconductor product.

In the context of the present application, a "boot security data structure" may, for example, denote a security data structure which can be created based on a previously created initial data structure and which can be used or accessed during a process of booting a semiconductor product. In particular, such a boot security data structure may be used or accessed each time a semiconductor product is booted. Such a boot security data structure may be correlated or linked with an assigned semiconductor product and may be generated by said semiconductor product on the basis of an initial security data structure. Generation of the boot security data structure by the semiconductor product may be accomplished at a product recipient entity to which the manufactured semiconductor product has been shipped, rather than at a product supplier entity. For example, a boot security data structure may be a reformatted or repackaged initial security data structure. In another embodiment, the boot security data structure and the initial security data structure may be identical. More generally, any modified security data structure (i.e. not only a boot security data structure) may be created based on the initial security data structure in any embodiment. Such a modified security data structure may be used for any appropriate purpose, including but not limited to control operation of the semiconductor product, security management of the semiconductor product, booting of the semiconductor product, etc.

In the context of the present application, "booting" may, for example, be a process of starting a semiconductor product as initiated via hardware or by a software (in particular firmware) command. After it is switched on, a semiconductor product may have no software and/or necessary key in its memory, so that the booting process may load software and/or a necessary key into its memory before being operational (for example before executing a functional task). This booting process may be carried out or controlled by hardware or software (such as firmware) of the semiconductor product, or by a separate processor in a system, in particular at any time during a semiconductor power cycle.

In the context of the present application, an "external device" may, for example, be an electronic device which does not form part of the semiconductor product. An external device may be physically separate from the semiconductor product. It may be possible to communicatively couple said external device with said semiconductor product, for instance for data transmission.

In the context of the present application, a "root key" may, for example, be a cryptographic key from which other keys may be derived. For instance, the root key may be a symmetric key, i.e. a key which may be used both for encryption and decryption. A root key may be a public/private key pair generated by a certificate authority. The certificate authority (such as a service provider) can issue multiple certificates in the form of a tree structure or a generic certificate from which other keys may be derived or directly used. A root key may be the top-most certificate of the tree, the private key of which may be used to sign other certificates.

In particular, a unique key may be a key which is burned into a one-time programmable and may be part of the semiconductor product (for instance chip). In contrast to this, root keys may be CA (conditional access)-specific keys that may be put into a flash file (they may serve as roots to the key ladders, hence the name). The root keys may be encrypted by the unique key.

In the context of the present application, a "further processing logic" may, for example, comprise hardware (for instance electric circuitry, in particular comprising integrated circuit elements such as transistors) and/or software (for example firmware) providing a defined logic for data or signal processing. Said further processing logic may be configured for processing an initial security data structure and/or a root security data structure. Such a further processing logic may comprise functionality in terms of decryption, encryption, validation, authentication, reformatting, etc.

According to exemplary embodiments, an efficient management of secret keys for a semiconductor product may be made possible. During manufacturing a semiconductor product, a publicly readable identifier for identifying said semiconductor product as well as a secret unique key may be physically stored in said semiconductor product. However, a root key does not have to be stored into the semiconductor product during manufacture. In contrast to this, such a root key may be combined (in particular encrypted) with the unique key, and the result of this operation may be stored as an initial security data structure apart from the semiconductor product. These semiconductor products may then be shipped to a product recipient unit, such as an original equipment manufacturer (OEM). Said product recipient unit may also receive the above-mentioned initial security data structure separately from the semiconductor product. Hence, the initial security data structure may be supplied to the semiconductor product at any later time after having completed manufacture of the semiconductor product. For example, the semiconductor product may further process said initial security data structure, for instance to determine a boot security data structure tailored to the requirements of the semiconductor product for booting. Such a manufacturing architecture may render it optional to permanently store a root key in the semiconductor product itself. For instance, such a root key or a security data structure depending on such a root key may be stored in an external device. With the described manufacturing technology, manufacture and logistics may be significantly simplified and rendered more flexible without compromising on security.

More specifically, an exemplary embodiment may ensure a secure storage of root keys in an external device, i.e. a storage unit apart from a semiconductor product. Conventionally, semiconductor products (such as chips for set-top boxes) may store root security keys in an on-chip one-time programmable (OTP). This is because storing them in an external device has been seen traditionally as a security issue, and also has been considered as presenting logistic challenges. However, the present inventors have surprisingly found that there are a number of benefits achievable when storing root keys in an external device, and compliance with security and logistic requirements may be possible. Storing root keys in an external device may reduce the effort for manufacturing semiconductor products and may have an advantageous impact on the supply chain. Exemplary embodiments thus provide a method to store root keys in an external device in a way that is secure, and may achieve compliance with logistics requirements. What concerns security, the root keys may be adequately secured in the external device. In terms of logistics, root key values may be loaded into the external device at a product recipient entity receiving a manufactured semiconductor product from a product supplier entity, rather than burning a root key in a semiconductor chip already during manufacture thereof. Storing a root key (or more precisely a security data structure being indicative of the root key) may be done long after manufacture of the semiconductor product, without the necessity of a cumbersome tracking between product supplier entity and product recipient entity.

In an embodiment, the method comprises carrying out said storing during manufacturing said semiconductor product by a product supplier entity, and carrying out said further processing after shipping said semiconductor product from said product supplier entity to a product recipient entity. In the context of the present application, the term "product supplier entity" may denote for example an entity providing the function of supplying semiconductor products. Such a product supplier entity may comprise one or more functionally cooperating product supplier sub entities all contributing to the supply of semiconductor products. One of said product supplier sub entities may manufacture semiconductor products and may initiate shipping of semiconductor products to a defined destination. Another one of said product supplier sub entities may have computing, processing, communications and/or networking resources and may be configured for providing data such as an initial security data structure. The various product supplier sub entities may be co-located, or may be arranged mutually remote at different locations. For instance, a product supplier entity may be a silicon manufacturer or a silicon vendor. In the context of the present application, the term "product recipient entity" may denote for example an entity providing the function of receiving semiconductor products. In particular, such a product recipient entity may also be configured for using the received semiconductor products for further manufacturing processes (for instance for manufacturing electronic devices or original equipment using said semiconductor products). For instance, electronic devices or original equipment in form of a set-top box, a mobile phone, a laptop computer, a router, a modem, a broadband product, and a television (TV) set may be manufactured on the basis of the received semiconductor products. A product recipient entity may comprise one or more functionally cooperating product recipient sub entities all contributing to the receipt and the further use of the received semiconductor products.

In an embodiment, the method comprises storing data corresponding to said initial security data structure (which depends on said root key and is defined at manufacture of said semiconductor product without a link between a product supplier entity and a product recipient entity) in a storage unit of an external device being physically separate from the semiconductor product. Hence, a method may be provided by which root keys stored in the external device can be defined at manufacture without requiring a link between foundry devices and OEM locations. This may make it possible to enforce anti-cloning and general security at the foundry without having to determine a-priori which OEM it will be shipped to (i.e. without initial link between foundry and OEM above). This may be achieved by ensuring that the database has the list of all manufactured chips, so there is no need to predict where each part is going.

In an embodiment, the method comprises further processing, using said unique key, said initial security data structure by said semiconductor product for generating a boot security data structure for use by said semiconductor product for booting. The semiconductor product may receive the initial security data structure and may process it later. For instance, this semiconductor product may retrieve the root key contained (in particular in an encrypted way) in the initial security data structure. This semiconductor product may also repackage or reformat the received initial security data structure for creating the boot security data structure which the semiconductor product itself can use during each booting process.

In an embodiment, the method comprises storing said boot security data structure in a storage unit of said semiconductor product or in a storage unit of an external device being physically separate from the semiconductor product. It is also possible that the data is also stored internally in a non-volatile memory. 1000 In an embodiment, the external device may be any kind of external non-volatile memory. This includes any type of external flash, one-time programmable, or other nonvolatile memory. In one embodiment, a storage unit (such as a nonvolatile memory) for permanently storing said boot security data structure may form part of the semiconductor product itself. In another embodiment, the security data structure (being indicative of the root key) may not be permanently stored in the semiconductor product, but in an external device which the semiconductor product may access.

In an embodiment, the method comprises further processing, using said unique key, said initial security data structure by said semiconductor product for deriving information concerning said root key. Said further processing may be a decryption of the initial security data structure using the unique key for decryption purposes. When the root key has been encrypted using the unique key during manufacture of the semiconductor product, the root key may be retrieved by the semiconductor product processing the unique key which may be used for decryption.

In an embodiment, the method comprises encrypting said root key using said unique key for generating said initial security data structure. Hence, in the context of the manufacture of the semiconductor product, the unique key being assigned to a specific semiconductor product may be used to encrypt the secret root key. Thereby, the initial security data structure may be obtained and may then be supplied to a product recipient unit. This concept ensures confidentiality.

In an embodiment, the unique key can encrypt multiple root keys. More than one root key may be assigned to one semiconductor product.

In an embodiment, the method comprises cryptographically protecting (for example pre-encrypting) said root key before said encrypting of said root key using said unique key. In order to further improve security, the root key may undergo an additional pre-encryption process already prior to the encryption using the unique key. Hence, extra layers of protection, double protection or two-stage encryption may be achieved for further improving security. The pre-encryption may be carried out by a security provider providing the root key, so that the security provider supplies the root key already in a pre-encrypted form to a chip manufacturer. The chip manufacturer may then execute the second encryption of the pre-encrypted root key using said unique key for additional encryption.

In an embodiment, the method comprises generating a database comprising a plurality of initial security data structures, each initial security data structure of said database being assigned to another semiconductor product of a group of semiconductor products to be shipped to an assigned product recipient entity. The method may further comprise transmitting said database to said product recipient entity. When a set of semiconductor products is manufactured, each semiconductor product may have an assigned unique key and may have an assigned root key. Each unique key may be used for encrypting an assigned root key. Root keys may form part of the initial security data structures. A whole set of initial security data structures may be merged into a common database. By a public readable identifier, which may be assigned to each semiconductor product and corresponding root key, unique key and initial data security structure, an initial data security structure may be mapped to a specific semiconductor product.

In an embodiment, the method comprises generating a plurality of databases each comprising a plurality of initial security data structures, each initial security data structure being assigned to another semiconductor product of a group of semiconductor products to be shipped to an assigned product recipient entity. Different databases may be assigned to different service providers providing groups of root keys. The method may further comprise transmitting said databases to said product recipient entity. A service provider, for instance a conditional access (CA) provider, may be an entity providing root keys to a chip manufacturer (for instance a product supplier entity). When a product recipient entity collaborates with a plurality of service providers, a respective database (containing a plurality of corresponding initial security data structures) may be created for each of said service providers. This may simplify the mapping between individual semiconductor products and initial security data structures by the product recipient entity, even when a plurality of service providers is involved.

In an embodiment, the method comprises using said one or more root keys for at least one of the group comprising providing conditional access (CA) to video and/or audio content, digital rights management (DRM), or any other product that may require provisioning of secret keys at a secure manufacturing production line. In the field of pay-tv, access to video and/or audio content is provided to a user against payment of a fee. For distinguishing authorized users from non-authorized users, the possession of one or more secret keys (which may relate to the root key) may be a necessary condition. In particular, DRM tools may denote a set of access control technologies for restricting the use of proprietary hardware and restricted content (such as copyrighted works). DRM technologies may try to control the use, modification, and distribution of such content (for instance software, multimedia content, etc.), as well as systems within devices that enforce these policies. A module controlling conditional access may be an electronic device, for instance incorporating a slot for a smart card, which equips a set-top box or the like with an appropriate hardware facility to access (in particular view) conditional access content that has been encrypted.

In an embodiment, the method comprises reading said readable identifier from said memory for mapping said semiconductor product with an assigned initial security data structure. At a site of a product recipient entity, a huge plurality of semiconductor products (each storing, inter alia, an assigned non-secure readable identifier) and a huge plurality of initial security data structures (each being assigned to a respective semiconductor product identifiable by an assigned readable identifier) may be present. For retrieving the pertinent initial security data structure being assigned to a specific semiconductor product, the readable identifier may be used which links a specific semiconductor product to a specific initial security data structure.

In an embodiment, the method comprises manufacturing an electronic device based on said semiconductor product, said electronic device comprising at least one of the group consisting of a set top box, a router, a modem, a broadband product, and a television set. All these electronic devices may rely on semiconductor products with secure keys to ensure that only an authorized user gets access. In embodiments, the root keys may apply not only to a set-top box, but to any other type of device which needs security root keys. Hence, other electronic devices may be manufactured based on the semiconductor products according to exemplary embodiments.

In an embodiment of the semiconductor product, said memory comprises a secret memory unit for storing secret data including said unique key. Access to said secret memory unit may be restricted to authorized entities as a security protection. This may ensure that only authorized entities may get access to the secret key(s), for instance for decrypting the initial security data structure. In particular, a secret memory unit (such as an OTP) may only be accessed by the hardware which performs the decryption.

In an embodiment, said memory comprises a public memory unit for storing non-secret data including said readable identifier. Access to said public memory unit may be possible for each entity without the need of a specific authorization. This may ensure that each entity may get access to the readable identifier for identifying said semiconductor product, for instance for mapping purposes.

In an embodiment, said further processing logic comprises a decryption unit for decrypting said received initial security data structure using said unique key. Said decryption unit may have access to the unique key stored in the semiconductor product during its manufacture, for instance in a secret memory unit. By accessing said unique key and by its capability of interpreting the structure of a received initial security data structure, the decryption unit may be configured for executing the mentioned decryption task.

In an embodiment, said decryption unit is configured for deriving information concerning said root key from said decrypted initial security data structure. Hence, although the root key has not been permanently stored in the semiconductor product during manufacture, access to the root key may be nevertheless enabled by the functionality of the decryption unit.

In an embodiment, said further processing logic comprises a repackaging unit for repackaging said received initial security data structure (and/or information derived therefrom) to thereby generate said boot security data structure. The repackaging unit may receive information indicative of the decrypted initial security data structure from the decryption unit. The repackaging unit may create on this basis the boot security data structure, which may be accessed by the semiconductor product each time the semiconductor product boots. In this context, the repackaging unit may execute one or a plurality of processing tasks, some of which will be described in the following:

In an embodiment, said repackaging unit is configured for validating said initial security data structure before generating said boot security data structure. For example, such a validation may include a verification whether or not the initial security data structure has being correctly decrypted by the decryption unit.

In an embodiment, said repackaging unit is configured for repackaging said initial security data structure for permanently binding or linking said boot security data structure to said semiconductor product. In other words, the repackaging unit may reformat the initial security data structure into the boot security data structure to adapt it to the specifics of the assigned semiconductor product. Alternatively, it is possible that the initial security data structure is not modified after its decryption. Thus, the initial security data structure may also be identical to the boot security data structure.

In an embodiment, said repackaging unit is configured for forwarding said boot security data structure to a storage unit for storage. After repackaging, the boot security data structure may be stored (in particular permanently stored) in a dedicated storage unit, such as a non-volatile memory.

In one embodiment, said repackaging unit is configured for forwarding said boot security data structure to said storage unit being internally of said semiconductor product. Thus, said storage unit may form part of said semiconductor product itself in one embodiment. Hence, the storage unit which (in particular permanently) stores said boot security data structure may form part of the semiconductor product self.

In another embodiment, said repackaging unit is configured for forwarding said boot security data structure to said storage unit being externally from said semiconductor product. In particular, the system may comprise an external device being physically separate from the semiconductor product and comprising said storage unit. In such a configuration, the repackaging unit may transmit the created boot security data structure to such an external device with storage unit. In the latter mentioned embodiment, said root key may be not permanently stored in said semiconductor product. In contrast to this, permanent storage of the root key (or the boot security data structure including information about said root key) may be carried externally of the semiconductor product, i.e. in said external device.

In an embodiment, the semiconductor product is convertible or converted from a customizable configuration into a selectable or selected one of a plurality of different customized configurations. More specifically, said semiconductor product may be convertible or converted from a generic customizable configuration, in which said semiconductor product is capable of supporting a plurality of different functional applications, into a selectable or selected one of a plurality of different specific customized configurations, in which said semiconductor product is capable of supporting only one of the plurality of different functional applications. In the context of the present application, the term "customizable" may denote for example that a semiconductor product may be equipped with resources and/or may be configured for cooperation with at least one other entity to allow the customizable semiconductor product to be transferred from a still customizable configuration into a customized configuration. Customizing a customizable semiconductor product may then denote the process of activating certain functional blocks while deactivating other functional blocks of the semiconductor product in accordance with a customizing data structure or scheme. Initially, a customizable semiconductor product may still be in a generic configuration, based on which it can be transferred into one of a plurality of different selectable specific configurations, in which the semiconductor product is customized. In the context of the present application, the term "customized" may denote for example a property of a semiconductor product according to which the semiconductor product has been, prior to customization, freely customizable, but has meanwhile been customized so as to assume a specific rather than generic state. When the semiconductor product is in a customized state, it may be disabled from being convertible back into the generic state or into another specific customized state. In yet another embodiment, a controlling entity (such as a product supplier entity) may be enabled to convert back a customized semiconductor product into a customizable state or into another specific customized state.

For example, the semiconductor product may comprise a customizing unit configured for customizing the semiconductor product into one of the customized configurations selected by a received customizing data structure specifying a selected application of the semiconductor product. For example, such a customizing data structure may be transmitted as a communication message from the product supplier entity or from the product recipient entity to the semiconductor product. Hence, a previously generic semiconductor product (capable of supporting different applications) may be converted into a specific semiconductor product (customized for supporting only one specific of said applications).

The root key management architecture according to exemplary embodiments may make it possible to store a root key (or a boot security data structure being indicative of the root key) in the semiconductor product or in an external device assigned to the semiconductor product only at a product recipient entity, and not yet during manufacture of the semiconductor product. The specific access to its assigned root key (in particular in form of an initial or boot security data structure) may be defined after manufacture and shipping of the semiconductor product to a product recipient entity. In perfect compliance with this root key management scheme, it is also possible that an application-specific customization of the semiconductor product can also be accomplished at the site of the product recipient unit. This provides a high degree of flexibility in terms of root key management and customization of a semiconductor product at any time during a production cycle.

In an embodiment, the externally or internally stored keys may be symmetric keys. Symmetric keys may be used both for encryption and decryption. In another embodiment, the externally or internally stored keys may be asymmetric keys.

In an embodiment, one or more extra entities, units or layers of cryptographic operations, encryption, authentication, or countermeasures in hardware may be applied in any combination to secure the externally or internally encrypted root keys. Such entities, units or layers may be realized in software and/or hardware.

In an embodiment, the external storage device may be a secured element which requires a secure protocol to communicate with the base chip. This may further increase data security.

In an embodiment, root keys are decided at a product recipient entity (such as an original equipment manufacturer), rather than at manufacturing time.

In an embodiment, the semiconductor product comprises at least one of the group consisting of a broadband chip and a video chip. For example, a broadband chip may be embodied as a multimedia gateway SoC (system-on-a-chip) which may provide functionality in terms of multistream internet protocol television (IPTV), voice, data and home networking. However, the semiconductor product may also be used for other applications, such as audio applications.

In an embodiment, the semiconductor product may be a chipset. For example, a "chipset" may denote a set of electronic components in an integrated circuit such as a data flow management system that manages a data flow between a processor, a memory and peripherals. A chipset may for instance be assembled at a motherboard. Chipsets may be designed to work as microprocessors.

According to exemplary embodiments, a scheme for securely storing root keys, in particular in an external device, is provided. Said scheme may be configured for supporting many root keys while simultaneously drastically reducing the storage requirements in a memory, such as a one-time programmable, of a semiconductor product. Advantageously, a corresponding method may ensure that the root keys stored in the external device cannot be cloned to multiple devices. In said scheme, the root keys stored in the external device can be defined at manufacture without requiring a link between manufacturing devices and locations of a product recipient entity, such as an original equipment manufacturer. Advantageously, the root key configuration can be defined at the product recipient entity, rather than at the time and place of the manufacture of the semiconductor product. Furthermore, the described root key management may ensure that the root keys stored in the external device cannot be read by a non-authorized entity. In said scheme, it may also be ensured that the root keys stored in the external device cannot be modified. Furthermore, the mentioned scheme may provide support for multiple key owners (such as multiple service providers) without significantly impacting a die size. Furthermore, the described root key management may allow to drastically reduce one-time programmable effort at a tester for testing the semiconductor products or an electronic device comprising one or more such semiconductor products. As part of said scheme, there may be a configuration or ability to create key packages after the semiconductor product (for example a chipset) is produced, instead of being required to decide all key values before finalization of semiconductor (in particular silicon) processing. Furthermore, there may be the configuration or ability to assign root keys based on a desired application, rather than having all potential root keys from all security providers pre-loaded into a device. This may reduce the exposure risk for keys which are not associated with a specific application. In an embodiment, asymmetric keys may be used. Such a scenario may involve the ability to change the chain of trust in a way that it does not rely on a product recipient entity. When asymmetric keys are used to allow changing the root of trust, there may be a configuration or ability to revoke chains of trust at the production line in the case that keys have leaked.

In the following, an overview over the technology of exemplary embodiments will be given, followed by a problem statement. Thereafter, it will be demonstrated how exemplary embodiments may overcome conventional shortcomings and provide an efficient and secure root key management system.

A set-top box or other semiconductor product-based system may rely on chip-specific symmetric and asymmetric keys to serve as the root of system security. These chip-specific keys may be used as sources to derive lower level keys, which may then be used for various security functions.

Because the semiconductor product-specific (in particular chip-specific) root keys are unique per semiconductor product (such as chip), they cannot be easily hard-coded into chip logic or placed into a ROM (read only memory), as these may be common for all chips. This leaves in particular two choices for storing root keys: In one option, root keys may be stored in an on-chip one-time-programmable memory (OTP) or non-volatile memory. In another option, root keys may be stored in an external device that can be read by the chip hardware and CPU (central processing unit) systems.

Traditionally, chip-specific symmetric root keys are stored in an on-chip OTP for a number of reasons: Storing root keys in an external device can potentially expose the key values, since an external device may be easily viewable by non-secure entities. Moreover, storing root keys in an external device can potentially allow different keys to be substituted, since an external device may be freely writeable. Furthermore, storing root keys in an external device can potentially allow a malicious product recipient entity to clone the same keys across many devices, for illegitimate business reasons. Cloning of keys is a major concern for the owners of those keys. Beyond this, storing root keys in an external device may require forging a link between the key values decided at manufacture, and the location of the product recipient entity. This is true because the product recipient entity may use an off-the-shelf external device which has no previous association with a set-top-box chip. Yet another conventional issue is a fundamental limitation. Root key values may be decided at chip manufacture, so if they are not burned into the chip at that time, an association has to be made between the bare silicon device at manufacture and its eventual home at a product recipient entity. This product recipient entity can be located anywhere in the world. Typically, associating manufacturing devices with their final shipping location is logistically infeasible.

Despite the above conventional concerns, the conventional method of storing root keys in a one-time programmable of a semiconductor product may also create several issues or shortcomings: Such an approach may take up significant silicon area. This adds manufacturing effort to the semiconductor product (such as a set-top box chip). Said issue may be compounded by the fact that the semiconductor product may be required to support the keys of multiple owners simultaneously, increasing data storage requirements of the one-time programmable memories. A one-time programmable may require significant effort to support test, reliability burn-in, and programming. This effort may further go up as more data is stored in the one-time programmable. Moreover, putting keys into a one-time programmable at semiconductor product manufacture time may require deciding the semiconductor product (for example set-top box chip) usage up front, instead of later in the production cycle for better flexibility. Handling the above issue by burning one-time programmable keys for all potential owners may swell the one-time programmable data storage requirements even further, and/or may result in a limited number of keys per partner.

In view of the foregoing, there may be a need for an at least partial solution to the aforementioned and/or other shortcomings, so that root keys can be managed efficiently, for instance stored in an external device.

FIG. 1 illustrates a flowchart 200 of a method according to an exemplary embodiment. Concerning the reference signs used for the description of FIG. 1, reference is made in particular to FIG. 2 to FIG. 6.

Referring to a block 202, the method may comprise storing a readable identifier 100, which identifies a semiconductor product 102, and a unique key 104, being unique for said semiconductor product 102, in a memory 106 of said semiconductor product 102.

Now referring to a block 204, the method may comprise generating an initial security data structure 108. Said initial security data structure 108 may depend on a root key 114 and on said unique key 104. For example, each initial security data structure 108 may be a file. Both said root key 114 and said unique key 104 may be assigned to said semiconductor product 102. Said initial security data structure 108 may be assigned to said readable identifier 100.

Now referring to a block 206, the method may comprise supplying said initial security data structure 108 to said semiconductor product 102 for further processing.

In the following, an overview of exemplary embodiments will be given based on FIG. 2. Thereafter, referring to FIG. 3, FIG. 4 and FIG. 5, the functionality of exemplary embodiments will be described in further detail. An alternative configuration will then be described referring to FIG. 6.

Figure 2:
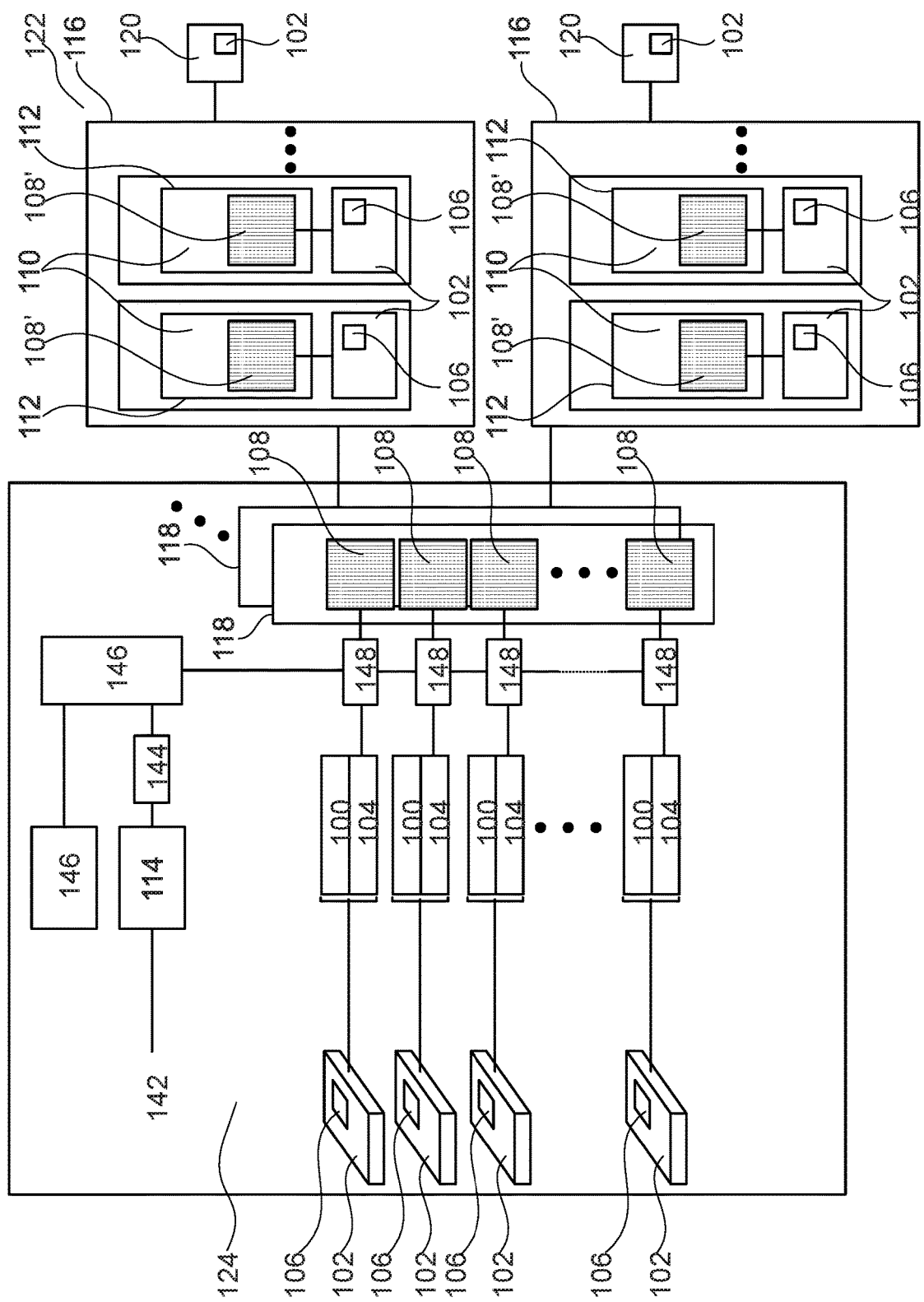
FIG. 2 illustrates a system according to an exemplary embodiment.

FIG. 2 illustrates a system 122 according to an exemplary embodiment.

The described system 122 comprises a plurality of semiconductor products 102. For example, each semiconductor product 102 may be a chipset. It is possible that a respective semiconductor product 102 may be used as a chip for a set-top box. Each semiconductor product 102 may comprise a memory 106, for example a one-time programmable (OTP). Memory 106 may be monolithically integrated in the semiconductor body of the respective semiconductor product 102. In each memory 106, an individual readable identifier 100, identifying said specific assigned semiconductor product 102 may be stored during a process of manufacturing the semiconductor product 102. The readable identifier 100 may be publicly readable, i.e. may be non-secure and may be therefore non-protected. Furthermore, a respective unique key 104, each being unique for said specific semiconductor product 102, may be stored as well in the memory 106 of the respective semiconductor product 102 during manufacture. The unique key 104 may be a secure key and may not be publicly readable by a non-authorized entity. This may avoid a risk of cloning of secure semiconductor products 102, since each semiconductor product 102 obtains a secure unique key 104.

Furthermore, the system 122 of FIG. 2 comprises a plurality of storage units 110 each being assigned to a respective external device 112. "External" means separately from the semiconductor products 102. Each external device 112 may be logically and communicatively assigned to a respective one of the semiconductor products 102, but may be physically separate therefrom. For example, each storage unit 110 may be a non-volatile memory. As will be explained below in further detail, a boot security data structure 108' may be stored in each storage unit 110. Each respective boot security data structure 108' may depend on a semiconductor product-specific root key 114 and on said unique key 104 being assigned to the same semiconductor product 102 as the aforementioned root key 114. Furthermore, said boot security data structure 108' may be assigned to said readable identifier 100 and may be used by said semiconductor product 102 for booting. Hence, a semiconductor product 102 may access the boot security data structure 108' in its assigned external device 112 each time it boots or starts up. The boot security data structure 108' may allow to derive or retrieve information concerning the assigned root key 114. Furthermore, each boot security data structure 108' may be generated by the assigned semiconductor product 102 based on an initial security data structure 108 created during manufacture and described below.

Thus, information concerning the root key 114 for a respective semiconductor product 102 may be stored in the storage unit 110 of the assigned external device 112 which is physically separate from the semiconductor product 102. External device 112 and assigned semiconductor product 102 may be configured for data exchange in between. Since information about the root key 114 can be stored in the external device 112 in form of the boot security data structure 108', it may be not necessary that said root key 114 is permanently stored in said semiconductor product 102.

As already mentioned, the readable identifier 100 and the unique key 104 for said semiconductor product 102 may be both stored in memory 106 of said semiconductor product 102 during the manufacturing process of the semiconductor product 102 by a product supplier entity 124. Product supplier entity 124 may be a semiconductor manufacturer. Furthermore, an initial security data structure 108 may be generated for each semiconductor product 102 by the product supplier entity 124. Said initial security data structure 108 may be created to depend on said root key 114 and on said unique key 104 of the assigned semiconductor product 102. More specifically, the root key 114 may be encrypted with the unique key 104 for generating the initial security data structure 108.

Each root key 114 of each semiconductor product 102 may be provided by a service provider 142. By the provided root keys 114, it is for example possible that a readily manufactured set-top box (see electronic device 120 on the right-hand side of FIG. 2) can protect video content by encryption. The service provider 142 may pre-encrypt each root key 114 in a pre-encryption unit 144. After pre-encryption, pre-encrypted root key 114 may be connected with other data 146 provided by the service provider 142 as well. The result of this data processing is a preliminary security data structure 146. Said pre-encryption is optional. After said optional pre-encryption, if carried out, the process may proceed with an encryption of said pre-encrypted (or alternatively original) root key 114 using said unique key 104. This process can be carried out by a respective encryption unit 148 at the product supplier entity 124. Thus, the process may encrypt said root key 114 using said unique key 104 for generating said initial security data structure 108. In other words, the respective encryption unit 148 may encrypt the root key 114 with the unique key 104 of a respective semiconductor product 102 to thereby create the initial security data structure 108 for each individual semiconductor product 102. However, the root key 114 is not burned into or stored in the semiconductor product 102 at the product supplier entity 124.

All initial security data structures 108 relating to a respective service provider 142 may be stored in a separate database 118. Each initial security data structure 108 of said database 118 may be assigned to another semiconductor product 102 of a group of semiconductor products 102 to be shipped to an assigned product recipient entity 116. It may also be possible to generate a plurality of databases 118, wherein different databases 118 may be assigned to different service providers providing groups of root keys 114 for different sets of semiconductor products 102.

After completing manufacture of the semiconductor products 102 by the product supplier entity 124 and after completing generation of the initial security data structures 108 by the product supplier entity 124, a set of semiconductor products 102 may be physically shipped to a respective one of multiple product recipient entities 116. For instance, the product recipient entities 116 may be different original equipment manufacturers (OEMs). Furthermore, one or more of the databases 118 relating to a respective product recipient entity 116 may be transmitted to the pertinent product recipient entity 116. Said transmission may be carried out for example over a communications network (for instance the public Internet) and/or by a data carrier (such as a memory stick or a hard disk). When shipping the manufactured semiconductor products 102 to the pertinent product recipient unit 116, the root key(s) 114 assigned to a respective semiconductor product 102 is not stored in the semiconductor product 102. Hence, the readable identifier 100 and the unique key 104 may be burned in the assigned semiconductor products 102 during manufacturing said semiconductor product 102 by the product supplier entity 124, but not the root key 114. The root key 114 may be encoded in the respective initial security data structure 108.

Further processing of the transmitted initial security data structure 108 for creating a respective boot security data structure 108' may be carried out by the respective semiconductor product 102 after shipping said semiconductor product 102 from said product supplier entity 124 to said product recipient entity 116. It may be possible to read said readable identifier 100 from the memory 106 of a respective semiconductor product 102 for mapping said semiconductor product 102 with an assigned initial security data structure 108. In other words, the readable identifier 100 of a respective semiconductor product 102 may allow to retrieve a matching initial security data structure 108 from a large plurality of initial security data structures 108 of one or more databases 118, which matching initial security data structure 108 relates to said semiconductor product 102. In order to enable the semiconductor product 102 to execute such further processing, it may then be possible to supply said initial security data structure 108 to said semiconductor product 102 at the product recipient entity 116. During said further processing, said initial security data structure 108 may be processed by said semiconductor product 102, using said unique key 104, for generating the boot security data structure 108' for use by said semiconductor product 102 for booting. Said further processing may include a decryption of the initial security data structure 108. Said decryption may allow to retrieve information about the root key 114. Furthermore, said further processing may include a repackaging or reformatting of the initial security data structure 108 or its data elements, to thereby create the boot security data structure 108' matching to the needs of the semiconductor product 102. Descriptively speaking, the repackaging or reformatting may match the structure of the boot security data structure 108' to the specifics of the semiconductor product 102. As shown in FIG. 2, the boot security data structure 108', which may be indicative of the root key 114, may then be stored in a storage unit 110 of a respective external device 112. More specifically, the created boot security data structure 108' may be stored in the storage unit 110 of the external device 112 which is assigned to the semiconductor product 102, but which is physically separate from the semiconductor product 102 in the embodiment of FIG. 2. The semiconductor product 102 may further process, using said unique key 104, said initial security data structure 108 for deriving information concerning said root key 114. This process will be described below in more detail referring to FIG. 4.

Root key management for a respective semiconductor product 102 may thus be completed in the product recipient entity 116, rather than in the product supplier entity 124 and thus late in the production chain. In the product recipient entity 116 (such as an original equipment manufacturer), an electronic device 120 may be produced based on one or more of said semiconductor products 102, preferably after said further processing. For example, said electronic device 120 may be a set top box comprising a chipset-type semiconductor product 102 with root key 114 contributing to conditional access or digital rights management.

The embodiment of FIG. 2 allowing storage of a root key 114 assigned to a semiconductor product 102 in an external device 112 may have in particular the following elements:

A database 118 with chip-unique keys, where each element of the database 118 contains multiple keys that may be assigned to a single unique semiconductor product 102 (such as a chip) for storage in an external device 112 having a storage unit 110 (such as a flash). In an embodiment, there may be multiple such databases 118, one for each security provider 142 (for instance security partner or key owner).

Advantageously, only a limited amount of data needs to be stored in a memory 106 (for example an OTP) of a respective semiconductor product 102. Said stored data may be a chip-specific readable identifier 100 and a single (in particular root symmetric) key, i.e. unique key 104.

The individual root keys 114, each assigned to a respective external device 112, may be first encrypted with a strong cryptographic algorithm at manufacture, see pre-encryption unit 144. Then, the database elements (which assemble these encrypted keys into chip-specific groupings for storage in external device 112) may be further encrypted in the respective encryption unit 148 by the chip-specific unique key 104 programmed into the OTP of the respective semiconductor product 102.

The entire database(s) 118, which may be multiply encrypted, may be sent to the product recipient entity 116. The product recipient entity 116 may use the OTP-programmed readable identifier 100 to locate the specific element(s) of the database(s) 118 needed for that particular semiconductor product 102. Said elements may be the above-described initial security data structures 108.

The product recipient entity 116 may work with chip security logic to authenticate the encrypted initial security data structure(s) 108 of the database(s) 118. This may be accomplished using an asymmetric algorithm (like RSA, Rivest-Shamir-Adleman). After further processing of the pertinent initial security data structure(s) 108, the respective modified or boot security data structure 108' may be stored. To put it shortly, it may be possible to burn the digest of all database elements (such as files) into the OTP of the chip. At the product recipient entity 116, it may be possible to write the pertinent database element(s) to the external device 112.

Henceforth, the semiconductor product 102 can source keys from the database elements (after the appropriate decryption and authentications), rather than the OTP. It should be mentioned that an OTP may nevertheless be used. However, it may be possible to provide the OTP with far reduced storage requirements than if all root keys were placed in the OTP. Also, this scheme may allow keys to be decided much later in the production cycle. This may increase flexibility and freedom of design.

As explained in the following, an exemplary embodiment may overcome conventional shortcomings: The conventional shortcoming that storage in an external device can potentially expose key values may be solved by encrypting the keys and database elements in particular by multiple cryptographic operations. The conventional issue that storage in an external device can potentially allow different keys to be substituted may be overcome by authentication and then cryptographically binding (e.g. hash-locking) the database elements at the product recipient entity 116. Once they are hash-locked in OTP, they cannot be modified. Yet another conventional issue is that storage in an external device can potentially allow a malicious product recipient entity 116 to clone the same keys across thousands of devices. Such a risk may be overcome by exemplary embodiments by requiring that each database element be uniquely encrypted using a chip-specific key burned in the OTP. Thus, cloning the same key file to multiple chips will not work. This may further improve the security level of exemplary embodiments.

Still another conventional issue is that storage in an external device required forging a link between the key values decided at manufacture, and the location of the product recipient entity 116. Such issues may be solved in exemplary embodiments by sending the entire database(s) of key files to each product recipient entity 116, representing all manufactured semiconductor products 102. Linking semiconductor products 102 at manufacture with a specific product recipient entity 116 may be not needed, because the product recipient entity 116 may have access to the files for all semiconductor products 102. Another conventional shortcoming is that OTPs have been large and required a significant silicon area. According to exemplary embodiments, much smaller OTPs or other memories 106 in a semiconductor product 102 may be possible, since root keys 114 are not burned into such a memory 106 during manufacture.

Another conventional shortcoming has been that a semiconductor product 102 (such as a set-top box chip) required to support the keys of multiple owners simultaneously, increasing data storage requirements of the OTP. According to exemplary embodiments, having multiple key owners may result in multiple key files that are stored in the external device 112. Therefore, managing multiple owners of root keys 114 has no longer a significant impact on die area or size.

Conventionally, OTPs require a significant effort to support test, reliability burn-in, and programming, in particular when more data is burned into an OTP. Because of the reduced OTP requirements of exemplary embodiments, effort for testing, burn-in, and programming may be reduced as well. It has also been an issue that putting keys into an OTP at chip manufacture time requires deciding the usage of the respective semiconductor product 102 up front, instead of later in the production cycle for better flexibility. According to exemplary embodiments, the root keys 114 may be decided much later in the production chain, because they may be not needed until reaching the stage of the product recipient entity 116.

In traditional approaches, handling the above issue by burning OTP keys for all potential owners swells the OTP data storage requirements even further and/or results in limited number of keys per partner. According to exemplary embodiments, each key owner can be given as many keys as needed, limited only by the storage inside the semiconductor product 102. Moreover, storage in the external device 112 may be insignificant.

Figure 4:
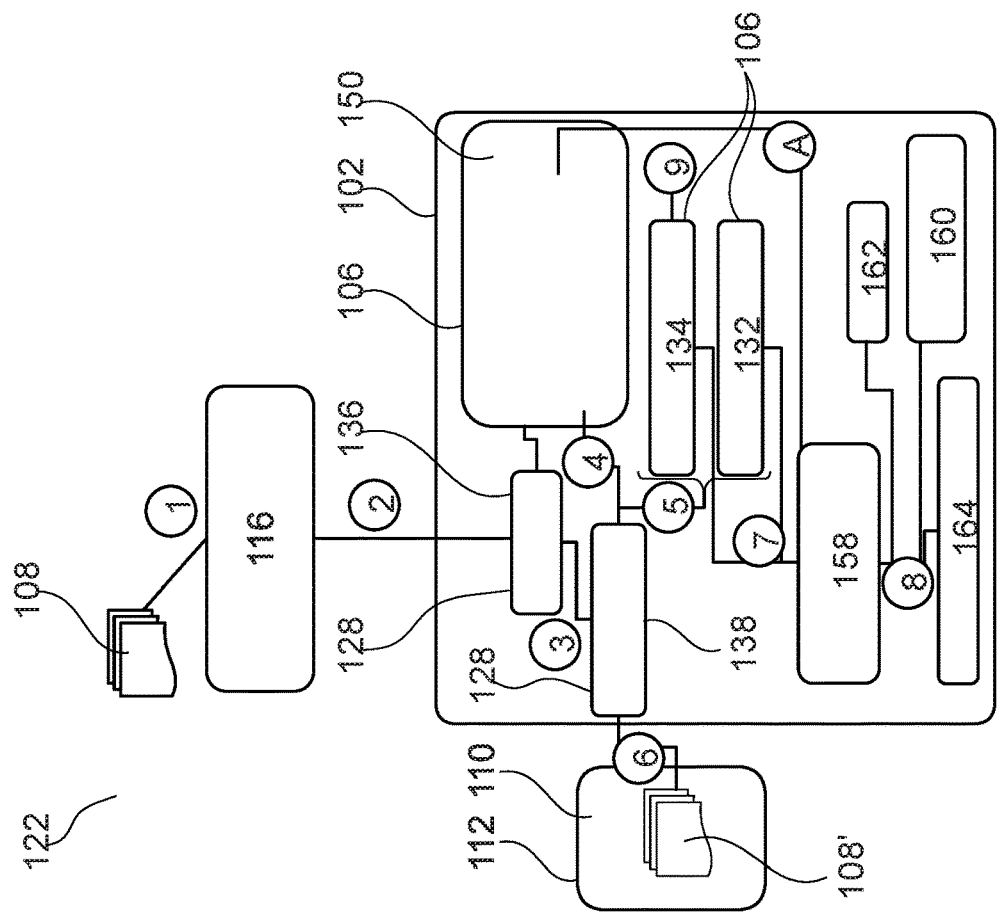
FIG. 4 illustrates a semiconductor product at a product recipient entity according to an exemplary embodiment.
Figure 3:
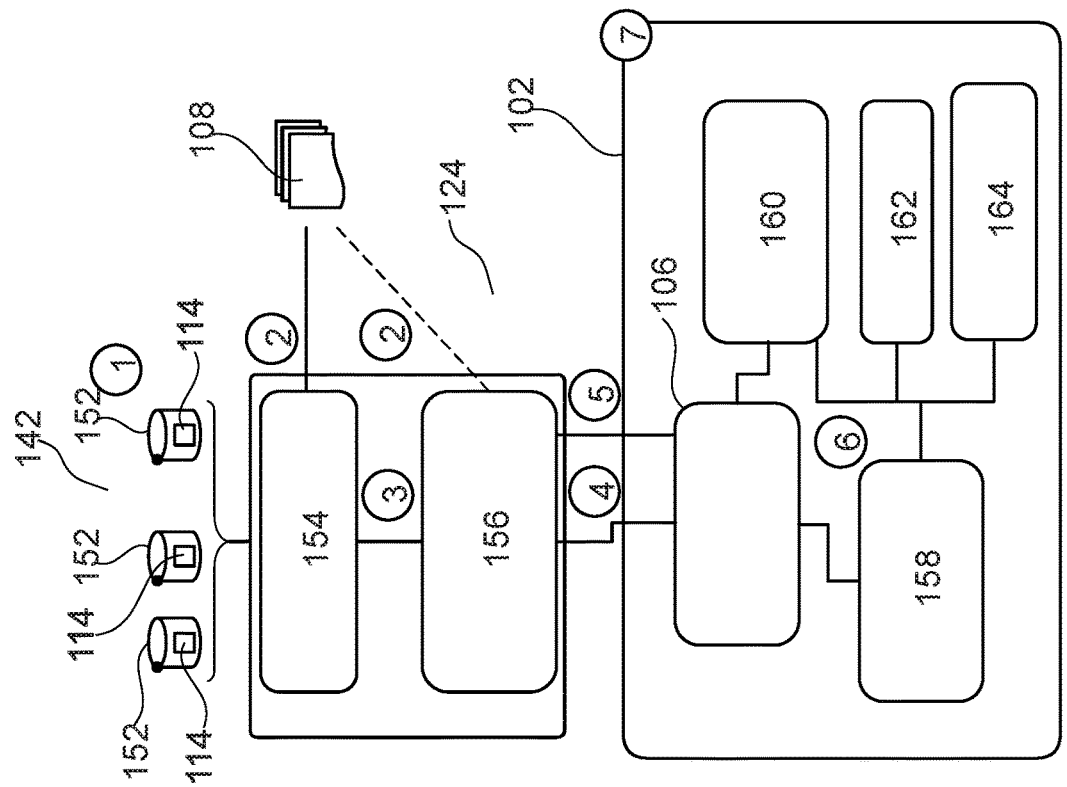
FIG. 3 illustrates a semiconductor product at a product supplier entity according to an exemplary embodiment.

FIG. 3 illustrates a semiconductor product 102 at a product supplier entity 124 according to an exemplary embodiment. Hence, FIG. 3 illustrates processes carried out with the semiconductor product 102 by the product supplier entity 124. FIG. 4 illustrates the semiconductor product 102 at a product recipient entity 116. Thus, FIG. 4 illustrates processes carried out with the semiconductor product 102 at the product recipient entity 116. FIG. 5 illustrates the semiconductor product 102 during booting. In other words, FIG. 5 illustrates a process carried out with a respective semiconductor product 102 on every boot after provisioning at product recipient entity 116.

In particular referring to FIG. 4 and FIG. 5, it is illustrated that semiconductor product 102 comprises a memory 106 (which may have multiple units). The above-described readable identifier 100, identifying said semiconductor product 102, may be stored in memory 106. Furthermore, the above-mentioned unique key 104, being unique for said semiconductor product 102, may be stored in memory 106 as well. Said readable identifier 100 and said unique key 104 are assigned to an initial security data structure 108, which is supplied to product recipient unit 116 and from there to semiconductor product 102 according to FIG. 4. Said readable identifier 100 and said unique key 104 are also assigned to boot security data structure 108', which can be created based on initial security data structure 108 by a further processing logic 128 of the semiconductor product 102. Moreover, both the initial security data structure 108 and the boot security data structure 108' may depend on the root key 114 which is assigned to said semiconductor product 102 and which is encrypted by said unique key 104. As already mentioned, semiconductor product 102 may comprise further processing logic 128 configured for further processing, using said unique key 104, said initial security data structure 108 upon receipt thereof for generating said boot security data structure 108' for use by said semiconductor product 102 for booting. Depending on the further processing logic 128 of the semiconductor product 102, the initial security data structure 108 and the boot security data structure 108' may be different from each other although having a similar content. Alternatively, the initial security data structure 108 and the boot security data structure 108' may be identical.

As shown in FIG. 4 and FIG. 5, said memory 106 may comprise different memory units. For example, memory 106 may comprise a one-time programmable or non-volatile memory unit 150. In order to make semiconductor product 102 compatible with legacy processes, corresponding information may be stored in one-time programmable or non-volatile memory unit 150. Moreover, memory 106 may comprise a secret memory unit 132 for storing secret data including said unique key 104. Access to secret memory unit 132 may require a specific authorization. Apart from this, memory 106 may comprise a public memory unit 134 for storing non-secret data including said readable identifier 100. Public memory unit 134 may be accessed without specific authorization.

Furthermore, said further processing logic 128 comprises a decryption unit 136 for decrypting said received initial security data structure 108 using said unique key 104. More specifically, said decryption unit 136 may be configured for deriving information concerning said root key 114 from said decrypted initial security data structure 108 making use of unique key 104.

Moreover, said further processing logic 128 may additionally comprise a repackaging unit 138 which may receive decrypted information from decryption unit 136. Repackaging unit 138 may be configured for repackaging data elements of said received initial security data structure 108 to thereby generate said boot security data structure 108'. The task of the repackaging unit 138 may include a validation of said initial security data structure 108 before generating said boot security data structure 108'. Apart from this, repackaging unit 138 may be configured for repackaging said initial security data structure 108 for permanently binding said boot security data structure 108' to said semiconductor product 102. It is also possible that said repackaging unit 138 is configured for forwarding said boot security data structure 108' to storage unit 110 of external device 112 for permanent storage. Storage unit 110 may be a non-volatile memory. Each time the semiconductor product 102 boots, boot security data structure 108' may be loaded from the external device 112 into the semiconductor product 102.

Now referring specifically to FIG. 3, a process carried out at product supplier entity 124 during manufacturing a semiconductor product 102 will be described in further detail.

Referring to a process stage 1, a service provider 142 delivers databases 152 with secret data to product supplier entity 124. Databases 152 may also include the root keys 114. To put it shortly, service provider 142 may provide its identifier/secret key pairs to product supplier entity 124.

Referring to a process stage 2, instead of programming the ID/key pairs (or other information concerning the root keys 114) in the respective semiconductor product 102, product supplier entity 124 may generate a unique encryption key per semiconductor product 102 and may use this unique key 104 to encrypt the secret material delivered by the service provider 142, in particular the root key 114. This means that said secret material can only be used in a single semiconductor product 102 (in particular a single chipset). As a result of said process, a respective initial security data structure 108 may be created by product supplier entity 124.

Referring to a process stage 3, a server (for example a crypto server) 154 of product supplier entity 124 may pass, to an automatic test equipment 156, the unique readable identifier 100 and the unique key 104 (which may also be denoted as equipment key) to be programmed in the semiconductor product 102. Other secrets can also programmed to assist with a verification process.

Referring to a process stage 4, the automatic test equipment 156 may program the secret unique key 104 in the memory 106 of the semiconductor product 102 (i.e. the same semiconductor product 102 as the one used to encrypt the identifier/secret key pairs the service provider 142). One OTP encryption key may be sufficient, but it can also be possible to program more keys to allow for a mix mode (for example a combination of a legacy process and a process according to an exemplary embodiment).

Referring to a process stage 5, the automatic test equipment 156 may verify that what has been programmed is correct.

Referring to a process stage 6, the product recipient entity 116 can optionally also use secrets that are used in a legacy process. Referring to FIG. 3, this may involve for instance a block 158 for key derivation functions, a block 160 providing other functions (for instance realized in hardware and/or in software, in particular in firmware), a processor 162 and/or encryption and/or decryption hardware 164.

Referring to a reference sign 7, the secrets provided by the service provider in process 2 may be not available to a product recipient entity 116 when receiving a semiconductor product 102.

Now referring specifically to FIG. 4, a process carried out at product recipient entity 116 after receipt of semiconductor product 102 and initial security data structure 108 will be described in further detail.

Referring to a process stage 1, product supplier entity 124 delivers the service provider material including keys (symmetric and/or asymmetric), in particular in form of initial security data structure 108, to the product recipient entity 116.

Referring to a process stage 2, the product recipient entity 124 may send one or more file-type initial security data structures 108 (which may be elements from the databases 118) to the chipset-type semiconductor product 102. Files sent from the product recipient entity 124 to the semiconductor product 102 may include a set of databases 118 (preferably one per service provider 142) having the encrypted keys. Each database element or initial security data structure 108 may be identifiable via a public readable identifier 100.

Referring to a process stage 3, decryption unit 136 of semiconductor product 102 may decrypt a respective file or initial security data structure 108.

Referring to process stages 4/5/6, repackaging unit 138 may receive the decryption results from the decryption unit 136 and may execute a repackaging function. During said repackaging, the semiconductor product 102 may validate the content of the respective file or initial security data structure 108 are may then repackage the file or initial security data structure 108 such that it is permanently bound to the semiconductor product 102 (process stage 4). According to process stage 5, a new file bound to the semiconductor product 102 may be created so that it can be loaded on every boot. Said new file may correspond to boot security data structure 108'. According to process stage 6, secrets may the saved externally (or alternatively internally) into a protected volatile memory, i.e. storage unit 110 of external device 112. This may be accomplished so that only an authorized hardware can have access to it.

Referring to a process stage 7, content of the files may be now available in the public memory unit 134 and in the secret memory unit 132, respectively, and can be used by the authorized hardware modules. The public data can be available to everyone (see reference sign 9).

Referring to a process stage 8, the semiconductor product 102 can now use the new secrets which were distributed by product supplier entity 124.

Now referring to an optional process stage A, the semiconductor product 102 can also work in a legacy mode using the legacy mode of personalizing the semiconductor products 102. Exemplary embodiments may be orthogonal. The aforementioned legacy operation can coexist on the same semiconductor product 102 with elements related to an operation according to exemplary embodiments. Each operation may be executed on the basis of different keys.

Once a semiconductor product 102 (such as a chipset) loses power, then it may need to reload the file, i.e. the boot security data structure 108', in the non-volatile memory unit 150 (see description referring to FIG. 5).

Referring to FIG. 5, a process will be described which can be executed on every boot after provisioning at product recipient entity 116.

In a legacy way of provisioning keys and/or identifiers at product supplier entity 124, the semiconductor product 102 may have all the keys and/or identifiers permanently programmed inside the semiconductor product 102, meaning that it can boot up and use the secrets. According to exemplary embodiments, secrets may be loaded from the external device 112 (comprising for instance a flash memory or a non-volatile memory as storage unit 110).

Referring to a process stage 1, the semiconductor product 102 loads from the external device 112 the file (binaries), i.e. boot security data structure 108', containing the keys and/or identifiers or any other material required by the service provider 142. The decryption unit 136 of the semiconductor device 102 may then decrypt the boot security data structure 108' using the unique key 104 embedded in the semiconductor product 102.

Referring to process stages 2/3, a verification and distribution unit 170 of the semiconductor product 102 may be used to verify the content of the loaded secrets and may also validate that the particular binary is already bound to the semiconductor product 102. More generally, verification and distribution unit 170 of the semiconductor product 102 may be configured to verify a content of the boot security data structure 108' and to distribute data within the semiconductor product 102.

Referring to a process stage 4, if validation succeeds, then the hardware of the semiconductor product 102 distributes the secret material to the volatile secret memory unit 132 and the non-secret material to the public memory unit 134.

Referring to process stages 5/6/7, once the external material is loaded in the corresponding memory, the semiconductor product 102 is operational.

Referring to a process stage A, both a legacy mode or a mode according to an exemplary embodiment can coexist, as described above.

Again referring to the hardware and/or software elements of the semiconductor product 102 according to FIG. 4 and FIG. 5, decryption unit 136 may contain crypto functions like AES (advanced encryption standard) to decrypt material or binaries that have been previously encrypted.

Repackaging unit 138 may contain logic which authenticates (for example using RSA, HMAC (Hash-based Message Authentication Code), etc.) the decrypted package. Furthermore, repackaging unit 108 may then re-assemble the binary/ies, may re-authenticate the new structure, may calculate a digest to uniquely bind the new binary to the semiconductor product 102, may re-encrypt the binary/ies to be saved in a non-volatile storage, etc. Hardware thereof may prevent a firmware from seeing decrypted keys.

Public memory unit 134 may be a volatile memory in the semiconductor product 102 that holds the data that does not need to be secret.

Secret memory unit 132 may be a volatile memory that keeps the secret data, and only specific elements in the semiconductor product 102 can access it.

Verification and distribution unit 170 may provide a function and may contain hardware needed to authenticate the loaded binary, confirm that the binary is bound to the semiconductor product 102 and then distribute the content through the memories.

The described hardware of the semiconductor product 102 can be fully autonomous or in some cases is instrumented by a central processing unit or a microcontroller that runs software (such as firmware).

There may also be custom hardware in semiconductor product 102 to prevent that the secret material can be accessed by unauthorized hardware and/or software (in particular firmware) modules. These controls may be achieved through a variety of mechanisms which may be implemented in hardware, for example:
  direct wiring of signals, i.e. not using common buses
  configuration of access control lists (ACL) in a bus and registers (for instance a secure entity may configure the ACL of the system before the operation related to an exemplary embodiment starts)
  the ACLs may be implemented in hardware using gates and flip-flops
  hardware may be intelligent to know how to parse all the files and place fields in their proper locations so that this task is not found by firmware The decryption unit 136, the repackaging unit 138 and the verification and distribution unit 170 are depicted as separate entities in the drawing, but they can be grouped in a single unit or another combination of multiple units.

FIG. 6 illustrates a semiconductor product 102 at a product recipient entity 116 according to another exemplary embodiment.

The embodiment of FIG. 6 differs from the embodiment of FIG. 4 in particular in that, according to FIG. 6, said storage unit 110 forms part of said semiconductor product 102, rather than being provided in an external device 112.

Furthermore, the embodiment of FIG. 6 differs from the embodiment of FIG. 4 in that, according to FIG. 6, the semiconductor product 102 is convertible from a customizable configuration into a selectable or selected one of a plurality of different customized configurations. For this purpose, the semiconductor product 102 according to FIG. 6 comprises a customizing unit 140 configured for customizing the semiconductor product 102 into one of the customized configurations selected by a received customizing data structure specifying a selected application of the semiconductor product 102. Hence, the semiconductor product 102 may be shipped to a product recipient entity 116 in a generic condition in which it is still capable to support different applications. By selecting one of said applications, which can be accomplished by the customizing unit 140 upon receipt of a customizing data structure, said generic semiconductor product 102 may be rendered functionally specific only after shipping to the product recipient entity 116. This concept of customization at the product recipient entity 116 (rather than at the product supplier entity 124) is compliant with the root key management which is completed also at the product recipient entity 116 (rather than at the product supplier entity 124).

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

Having now described some illustrative embodiments, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one implementation, the systems and methods described herein consist of one, each combination of more than one, or all of the described elements, acts, or components.

Any references to embodiments or elements or acts of the systems and methods herein referred to in the singular can also embrace embodiments including a plurality of these elements, and any references in plural to any implementation or element or act herein can also embrace embodiments including only a single element. References in the singular or plural form are not intended to limit the presently disclosed systems or methods, their components, acts, or elements to single or plural configurations. References to any act or element being based on any information, act or element can include embodiments where the act or element is based at least in part on any information, act, or element.

Any implementation disclosed herein can be combined with any other implementation, and references to "an implementation," "some embodiments," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and embodiments disclosed herein.

References to "or" can be construed as inclusive so that any terms described using "or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. The foregoing embodiments are illustrative rather than limiting of the described systems and methods. The scope of the systems and methods described herein can thus be indicated by the appended claims, rather than the foregoing description, and changes that come within the meaning and range of equivalency of the claims are embraced therein.

We claim:

1. A method, comprising:
    storing, in a memory of and during manufacturing of a semiconductor product, a readable identifier which identifies the semiconductor product, and a unique key, being unique for the semiconductor product or for a group of semiconductor products;
    generating an initial security data structure, the initial security data structure depending on a root key and on the unique key, wherein both the root key and the unique key are assigned to the semiconductor product, and wherein the initial security data structure is assigned to the readable identifier; and
    supplying the initial security data structure to the semiconductor product for further processing the initial security data structure, using the unique key for generating a boot security data structure for use by the semiconductor product for booting, the boot security data structure stored in a storage unit of an external device to the semiconductor product.

2. The method of claim 1, wherein storing the readable identifier and the unique key in the memory of the semiconductor product is performed during manufacturing by a product supplier entity, and further comprising performing further processing on the initial security data structure after shipping the semiconductor product from the product supplier entity to a product recipient entity.

3. The method of claim 1, further comprising processing the initial security data structure, by the semiconductor product using the unique key, to generate a modified security data structure or the boot security data structure for use by the semiconductor product.

4. The method of claim 3, further comprising storing the modified security data structure in a storage unit of the semiconductor product or in the storage unit of an external device physically separate from the semiconductor product.

5. The method of claim 1, further comprising processing the initial security data structure, by the semiconductor product using the unique key, to derive information about the root key.

6. The method of claim 1, further comprising encrypting the root key using the unique key for generating the initial security data structure.

7. The method of claim 6, further comprising pre-encrypting the root key before encrypting the root key using the unique key.

8. The method of claim 1, further comprising:
    generating a database comprising a plurality of initial security data structures, each initial security data structure of the database assigned to another semiconductor product of a group of semiconductor products to be shipped to an assigned product recipient entity; and
    transmitting the database to the product recipient entity.

9. The method of claim 1, wherein the method comprises:
    generating a plurality of databases, each database assigned to different service providers providing groups of root keys and comprising a plurality of initial security data structures, each initial security data structure assigned to another semiconductor product of a group of semiconductor products to be shipped to an assigned product recipient entity; and
    transmitting the databases to the product recipient entity.

10. The method of claim 1, further comprising storing, in the storage unit of the external device physically separate from the semiconductor product, data corresponding to the initial security data structure, the data depending on the root key and defined at manufacture of the semiconductor product without a link between a product supplier entity and a product recipient entity.

11. The method of claim 1, further comprising loading the root key into an external device at a product recipient entity receiving a manufactured semiconductor product from a product supplier entity.

12. A semiconductor product, comprising:
    a memory storing a readable identifier identifying the semiconductor product, and a unique key being unique for the semiconductor product or for a group of semiconductor products, the readable identifier and the unique key assigned, during manufacturing of the semiconductor product or the group of semiconductor products, to an initial security data structure and to a boot security data structure which both depend on a root key assigned to the semiconductor product and depending on the unique key;
    a processing logic configured for processing the initial security data structure, using the unique key, to generate the boot security data structure for use by the semiconductor product for booting; and
    wherein the boot security data structure is stored in a storage unit of a device external to the semiconductor product.

13. The semiconductor product of claim 12, wherein the memory comprises a secret memory unit for storing secret data including said unique key.

14. The semiconductor product of claim 12, wherein the memory comprises a public memory unit for storing non-secret data including said readable identifier.

15. The semiconductor product of claim 12, wherein the processing logic comprises a decryption unit for decrypting the received initial security data structure using the unique key.

16. The semiconductor product of claim 15, wherein the decryption unit is configured for deriving information concerning the root key from the decrypted initial security data structure.

17. A system, comprising:
- a semiconductor product comprising a memory storing a readable identifier, identifying the semiconductor product, and a unique key, being unique for the semiconductor product or for a group of semiconductor products; and
- a storage unit of an external device storing a boot security data structure which depends on a root key and on the unique key, wherein both the root key and the unique key are assigned to the semiconductor product, and wherein the boot security data structure is assigned to the readable identifier and is used by the semiconductor product for booting; and
- wherein the semiconductor product is configured to further process the initial security data structure, using the unique key, to generate the boot security data structure.

18. The system of claim 17, wherein the root key is not permanently stored in the semiconductor product.

\* \* \* \* \*